INVENTOR.
DAVID G. PECKHAM
BY
ATTORNEY

United States Patent Office 3,550,394
Patented Dec. 29, 1970

3,550,394
CONDENSATE HEATING OF INTERMEDIATE STRENGTH SOLUTION IN TWO-STAGE ABSORPTION MACHINE
David G. Peckham, La Crosse, Wis., assignor to The Trane Company, La Crosse, Wis., a corporation of Wisconsin
Filed Nov. 6, 1968, Ser. No. 773,880
Int. Cl. F25b 15/00
U.S. Cl. 62—485          6 Claims

ABSTRACT OF THE DISCLOSURE

An absorption refrigeration machine containing a two-stage generator effectively utilizes heat from the first stage generator high pressure steam condensate to heat intermediate strength solution in or immediately prior to the second stage generator.

BACKGROUND OF THE INVENTION

Field of the invention

This invention relates to an absorption refrigeration machine, and particularly to an absorption refrigeration machine which has a two-stage generator. The machine described hereinafter is efficient in the utilization of heat input. This machine utilizes condensate from high pressure steam supplied to a first generator to heat absorbent solution of intermediate strength in a second generator.

Discussion of the prior art

It is always desirable to increase the efficiency of an absorption refrigeration machine, thus making a more compact physical structure and also decreasing operating costs. Various modification of absorption machines have been made toward this end, including the addition of refrigerant economizers and multiplication of stages in a given operation within the absorption cycle.

Heretofore, condensate from the high pressure steam supplied to a generator has been returned to the steam source at a temperature near that at which it would be condensed at atmospheric pressures. The problem then is where and how can this heat containing condensate be efficiently utilized without upsetting the remaining portion of the absorption cycle.

SUMMARY OF THE INVENTION

The invention encompasses the method of using high pressure steam condensate from the first stage generator to heat or preheat the intermediate strength solution in or preceding the second stage or low pressure generator.

This invention provides an absorption refrigeration machine which includes an absorber, an evaporator, a condenser, and a chilled medium heat exchanger in heat transfer relationship with the evaporator. The improvement in the machine comprises a high pressure generator containing a second heat exchanger which has an inlet and an outlet. The inlet to the second heat exchanger is adapted to be connected to a source of steam. Restrictor means are connected to the outlet of the second heat exchanger to restrict the flow of condensate therefrom. The invention further comprises a low pressure generator, liquid passage means for conducting intermediate strength absorbent solution from the high pressure generator to the low pressure generator, a third heat exchanger located in the low pressure generator which has an inlet in liquid communication with the restrictor means and also has an outlet adapted to return condensate to the source of steam, and vapor passage means for conducting refrigerant vapor from the high pressure generator to the low pressure generator. This vapor passage means is in heat exchange relationship with the low pressure generator.

Alternatively, the third heat exchanger can be located outside the low pressure generator. The third heat exchanger in this arrangement is placed in heat exchange relationship with the liquid passage means for conducting intermediate strength solution from the high pressure to the low pressure generator.

DESCRIPTION OF THE PREFERRED EMBODIMENTS

Figure 1:
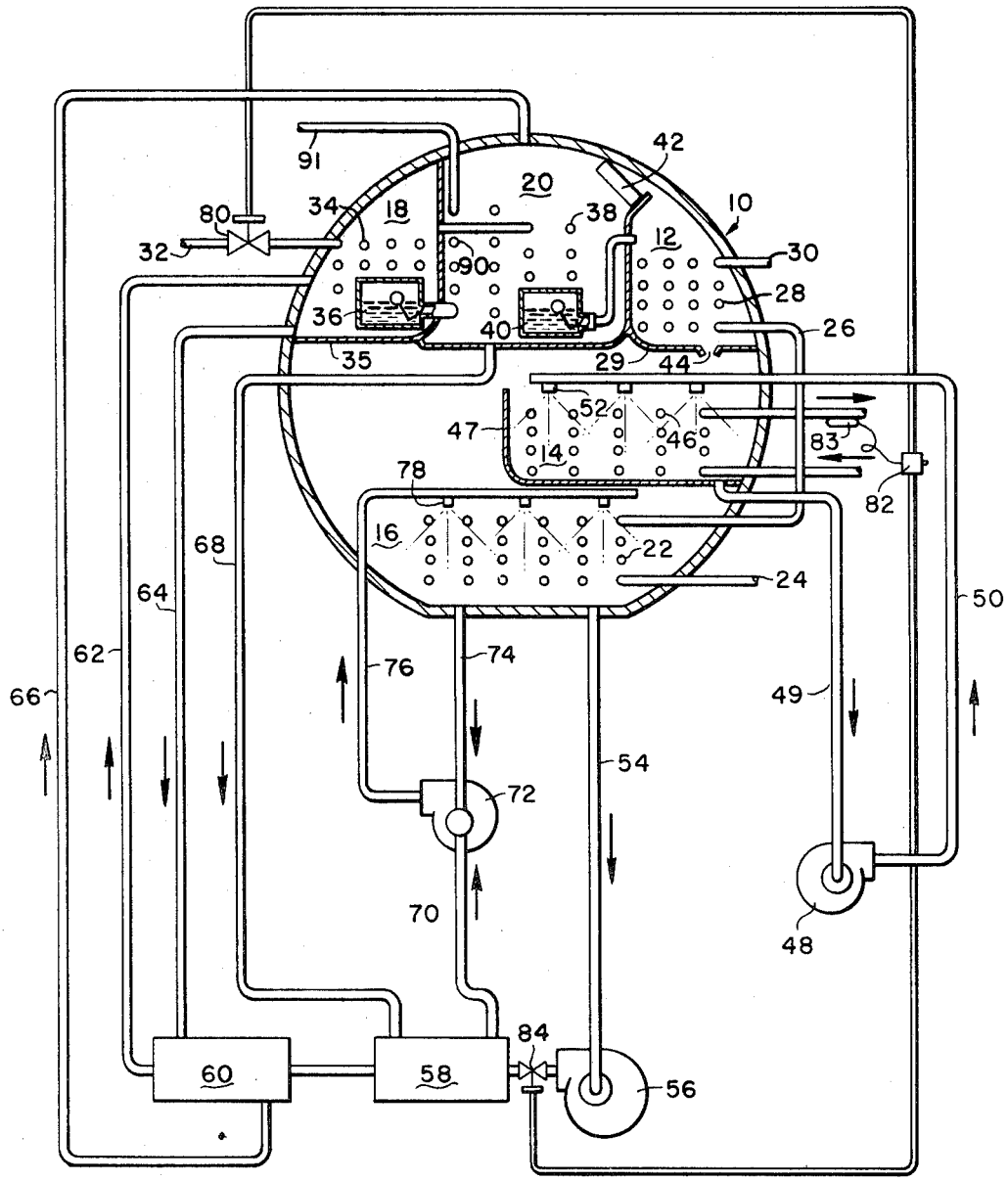
FIG. 1 is a schematic illustration of a single shell absorption refrigeration machine which has two generator stages producing refrigerant vapor.

FIG 1 schematically illustrates an absorption refrigeration machine comprising a fluid tight shell 10 enclosing a condenser 12, an evaporator 14, an absorber 16, a first stage generator 18 and a second stage generator 20.

The absorber 16 has a heat exchanger 22 supplied with cooling fluid from a source 24 to remove heat from the absorber. Source 24 can be water which is evaporatively cooled by air. This cooling fluid is conducted by a conduit 26 to a heat exchanger 28 in the condenser 12. Heat exchanger 28 comprises a plurality of longitudinally extending tubes. A wall 29 substantially encloses the condenser section. The cooling fluid leaves the condenser through a conduit 30.

Various types of refrigerants and absorbents may be used in the present machine. A solution of lithium bromide absorbent in a refrigerant such as water is satisfactory. Other absorbents and refrigerants may be used if desired. The term "concentrated solution" as used herein means a solution which is concentrated in absorbent.

The refrigerant vapor generated in the first stage generator 18 flows through a heat exchanger 38 in the second stage generator 20. Heat exchanger 38 comprises a plurality of longitudinally extending tubes. A flow regulating device 40 in the form of an orifice or trap regulates the flow of refrigerant from the heat exchanger 38 to the condenser 12. The heat from heat exchangers 38 and 90 causes the solution in the second stage generator to boil. The vapor passes through a liquid eliminator 42 into the condenser 12 in which the refrigerant vapor is condensed to a liquid. The liquid refrigerant flows through an opening 44 to the evaporator 14.

Absorbent solution in the absorber 16 absorbs refrigerant vapor from the evaporator 14 thus removing latent heat from the heat exchanger 46 in which fluid from a heat load is recirculated to the heat load. Heat exchanger 46 comprises a plurality of longitudinally extending tubes. Refrigerant liquid dripping from the heat exchanger 46 is collected by a pan 47 from which it flows through a conduit 49 to a pump 48 which delivers the refrigerant liquid through conduit 50 to be sprayed in the evaporator 14 through nozzles 52.

Solution from the absorber 16 flows through conduit 54, pump 56, low temperture heat exchanger 58, high temperature heat exchanger 60, and conduit 62 to the first stage generator 18 in which it is partially concentrated.

The partially concentrated solution flows through conduit 64 from first stage generator 18 to high temperature heat exchanger 60 and hence through conduit 66 to second stage generator 20 in which it is further concentrated. The concentrated solution from the second stage generator 20 flows through conduit 68 to low temperature heat exchanger and then through conduit 70 to pump 72.

Dilute solution flows from absorber 16 through conduit 74 to pump 72 to mix with concentrated solution flowing from conduit 70 to pump 72. The mixed solution flows from pump 72 through conduit 76 and is discharged through nozzles 78 into the absorber 16.

High pressure steam flows from a source 32 such as a boiler to a heat exchanger 34 in the first stage generator 18, which is enclosed from the rest of the shell by a wall 35. Heat exchanger 34 comprises a plurality of longitudinally extending tubes terminating in restrictor means 36. Restrictor means 36 can be any suitable steam flow restrictor such as orifice or a float valve as shown schematically at 36. Valve 36 allows substantially no steam to pass from heat exchanger 34. Heat from condensing steam in the heat exchanger 34 causes dilute absorbent solution in the first stage generator to boil.

The steam condensate from trap 36 flows into heat exchanger 90, which is located in the second stage generator 20. The condensate can be either subcooled in the liquid state or it can be flashed as it enters heat exchanger 90 and subsequently recondensed. The condensate entering heat exchanger 90 is at a substantially higher temperature than the intermediate strength solution in low pressure generator 20. After the desired amount of heat is removed from the condensate and transferred to the intermediate strength solution, it is returned to the steam source through conduit 91.

To vary the cooling capacity of the machine a steam control valve 80 controls the flow of steam to the heat exchanger 34 in the first stage generator. A thermostat 82 has a sensing bulb 83 in temperature sensing relationship with the temperature of the chilled water leaving the evaporator. The thermostat 82 is operatively connected to the valve 80 to open the valve on an increase of temperature as measured by the thermostat 82 and to close the valve on a decrease in temperature of the evaporator.

To improve the efficiency of the machine as the load is reduced, a solution flow valve 84 is placed in line 62. The thermostat 82 is operatively connected to the solution flow valve 84 to restrict the flow of solution from the discharge of the pump 56. The valve 84 is controlled by the chilled water thermostat 82. As the temperature of the chilled water adjacent bulb 83 decreases the thermostat operates to open valve 84 and circulate less solution through the system. This improves the coefficient of performance of the machine at loads less than maximum.

Figure 2:
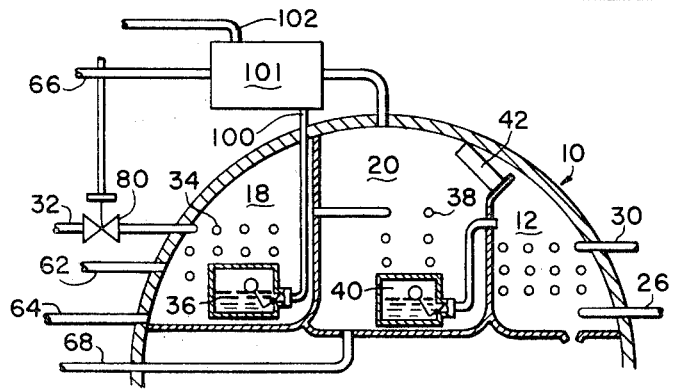
FIG. 2 is a schematic illustration of an alternate arrangement to that depicted in FIG. 1.

FIG. 2 illustrates an alternative embodiment of the subject invention. For explanatory purposes it is necessary to show only the upper portion of the absorption machine, which includes the high and low pressure generators and the condenser. The amount of high pressure steam entering the high pressure generator 18 from source 32 is controlled by valve 80. The steam enters heat exchanger 34 and condenses, transferring heat to the weak absorbent solution therein. Trap 36 allows only condensate to flow from heat exchanger 34 into conduit 100. The high temperature condensate flows into heat exchanger 101 and gives up heat to intermediate strength solution flowing through conduit 66 into low pressure generator 20. The condensate is returned to the steam source via conduit 102.

Refrigerant vapor produced in generator 18 passes into heat exchanger 38, from which heat is transferred to intermediate strength solution in low pressure generator 20. The remainder of the absorption cycle is identical to that shown and described in conjunction with FIG. 1.

What is claimed is:

1. In an absorption refrigeration machine including an absorber section, an evaporator section in fluid communication with said absorber section, a condenser section in fluid communication with said evaporator section, a chilled medium heat exchange means in heat transfer relationship with said evaporator section, the improvement comprising a first generator in fluid communication with said absorber section, a second heat exchange means adapted to be placed in communication with a source of steam, said second heat exchange means located inside said first generator, means for restricting the flow of condensate from said second heat exchange means, a second generator in fluid communication with said first generator and with said condenser, a third heat exchange means located in said second generator, means placing said third heat exchange means in fluid communication with said restricting means, means on said third heat exchange means adaptable to return said condensate from said third heat exchange means to said source of steam, a fourth heat exchange means in said second generator in vapor communication with said first generator and in liquid communication with said condenser section.

2. In an absorption refrigeration machine including an absorber containing absorbent, an evaporator, a low pressure condenser, a chilled medium heat exchanger in heat transfer relationship with said evaporator, the improvement comprising a high pressure generator having located therein a second heat exchanger which has an inlet and an outlet, said second heat exchanger inlet adapted to be placed in communication with a source of steam, restrictor means attached to said second heat exchanger outlet to restrict the flow of condensate therefrom, a low pressure generator having located therein a third heat exchanger which has an inlet and an outlet, said third heat exchanger inlet in fluid communication with said restrictor means to conduct condensate through said third heat exchanger, means attached to said third heat exchanger outlet to return the said condensate to the said souce of steam, means for conducting absorbent solution rich in refrigerant from said absorber to said high pressure generator, means for conducting partially concentrated solution from said high pressure generator to said low pressure generator, and means for conducting concentrated solution from said low pressure generator to said absorber.

3. In an absorption refrigeration machine including an absorber, an evaporator, a condenser, a chilled medium heat exchanger in heat transfer relationship with said evaporator, the improvement comprising:
  (a) a high pressure generator having located therein a second heat exchanger which has an inlet and an outlet, said second heat exchanger inlet adapted to be connected to a source of steam, restrictor means connected to said second heat exchanger outlet to restrict the flow of condensate from said second heat exchanger,
  (b) a low pressure generator,
  (c) liquid passage means for conducting intermediate strength absorbent solution from said high pressure generator to said low pressure generator,
  (d) a third heat exchanger located in said low pressure generator having an inlet in fluid communication with said restrictor means and further having an outlet adaptable to return condensate to said source of steam,
  (e) a fourth heat exchanger in said low pressure generator connected to receive refrigerant vapor from said high pressure generator and connected to discharge refrigerant into said condenser.

4. The machine of claim 3 wherein said condenser is a low pressure condenser.

5. The machine of claim 3, restrictor means attached to the outlet of said fourth heat exchange to restrict flow of refrigerant condensate from said fourth heat exchanger to said refrigerant condenser.

6. In an absorption refrigeration machine including an absorber, an evaporator, a condenser, a chilled medium heat exchanger in heat transfer relationship with said evaporator, the improvement comprising:
  (a) a high pressure generator having located therein a second heat exchanger which has an inlet and an outlet, said second heat exchanger inlet adapted to be connected to a source of steam, restrictor means connected to said second heat exchanger outlet to restrict the flow of condensate from said second heat exchanger,
(b) a low pressure generator,
(c) liquid passage means for conducting intermediate strength solution from said high pressure generator to said low pressure generator,
(d) a third heat exchanger located in said liquid passage means having an inlet in fluid communication with said restrictor means and further having an outlet adaptable to return condensate to said source of steam,
(e) a fourth heat exchanger in said low pressure generator connected to receive refrigerant vapor from said high pressure generator and connected to discharge refrigerant into said condenser.

References Cited

UNITED STATES PATENTS 2,548,699  4/1951  Bernat et al. _____ 62—843

FOREIGN PATENTS 723,873  12/1965  Canada _____ 62—489

J. MEYER PERLIN, Primary Examiner

P. D. FERGUSON, Assistant Examiner

U.S. Cl. X.R.

62—489, 497